(12) United States Patent
Bauman et al.

(10) Patent No.: US 9,003,285 B2
(45) Date of Patent: Apr. 7, 2015

(54) DISPLAYING README TEXT INSIDE AN APPLICATION

(75) Inventors: Brian Daniel Bauman, Austin, TX (US); Amanda Jane Burton, Austin, TX (US); Michael Pierre Carlson, Austin, TX (US); Travis M. Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2212 days.

(21) Appl. No.: 11/335,443

(22) Filed: Jan. 19, 2006

(65) Prior Publication Data

US 2007/0169063 A1    Jul. 19, 2007

(51) Int. Cl.
G06F 3/00       (2006.01)
G06F 9/44       (2006.01)

(52) U.S. Cl.
CPC .................................. G06F 9/4446 (2013.01)

(58) Field of Classification Search
None
See application file for complete search history.

(56) References Cited

U.S. PATENT DOCUMENTS

| | | | |
|---|---|---|---|
| 5,715,415 A | 2/1998 | Dazey et al. | |
| 5,838,321 A | 11/1998 | Wolf | |
| 5,877,757 A | 3/1999 | Baldwin et al. | |
| 5,995,987 A | 11/1999 | Iida et al. | |
| 6,744,450 B1 | 6/2004 | Zimniewicz et al. | |
| 6,871,348 B1 | 3/2005 | Cooper | |
| 6,910,208 B1 | 6/2005 | Zimniewicz | |
| 7,100,115 B1 * | 8/2006 | Yennaco | 715/748 |
| 7,162,717 B1 * | 1/2007 | Harris | 717/168 |
| 7,356,537 B2 * | 4/2008 | Reynar et al. | 707/100 |
| 7,383,320 B1 * | 6/2008 | Silberstein et al. | 709/219 |
| 2003/0014745 A1 * | 1/2003 | Mah et al. | 717/170 |
| 2003/0229608 A1 * | 12/2003 | Reynar et al. | 707/1 |
| 2004/0117783 A1 * | 6/2004 | Kaminsky et al. | 717/120 |
| 2004/0255234 A1 | 12/2004 | Methot | |

FOREIGN PATENT DOCUMENTS

WO    WO02097608 A2    12/2002

* cited by examiner

*Primary Examiner* — Don Wong
*Assistant Examiner* — Erika Kretzmer
(74) *Attorney, Agent, or Firm* — Yee & Associates, P.C.; Parashos Kalaitzis (57) ABSTRACT

An application includes functionality for dynamically modifying controls based on readme documentation content after the development of the application is substantially complete. A developer marks up a documentation file to include references to graphical user interface controls. The application generates a registry that stores associations between the documentation content and the affected controls. The application then modifies the properties of the affected controls to alter presentation or at least one behavior of each affected control. When the application creates an instance of an affected control, the control includes the modified presentation or behavior.

16 Claims, 6 Drawing Sheets

310 → Application Readme
=====================================================
This file contains last-minute product information, updates to the documentation, and troubleshooting tips.

System Requirements
- Intel® Pentium®II processor or better
- Operating system: Windows XP®
- 128 MB RAM minimum; 256MB RAM or more recommended
- 50 MB available hard disk space Printing
- If the default printer is changed while the application is running, the application may not detect the change until it is closed and restarted.

Running Application Over a Network
- In the current version, the application cannot store any of its working files on network drives.

320 → Application Readme
=====================================================
This file contains last-minute product information, updates to the documentation, and troubleshooting tips.

System Requirements
- Intel® Pentium®II processor or better
- Operating system: Windows XP®
- 128 MB RAM minimum; 256MB RAM or more recommended
- 50 MB available hard disk space 322 → Printing
- <GUI 01225001> If the default printer is changed while the application is running, the application may not detect the change until it is closed and restarted.</GUI>

324 → Running Application Over a Network
- <GUI 01670119> In the current version, the application cannot store any of its working files on network drives.</GUI>

DISPLAYING README TEXT INSIDE AN APPLICATION

BACKGROUND OF THE INVENTION

1. Field of the Invention

The present invention relates generally to data processing and, more particularly, to user interfaces in computer applications. Still more particularly, the present invention relates to displaying application documentation inside an application user interface.

2. Description of the Related Art

Often, bugs are discovered in a software product right up to the release date and even later. Because software products are often released in multiple languages, documentation must be finalized and ready for translation far before the product ships. In the meantime, the software product will continue to evolve as it is tested and finishing touches are added. Any bugs or workarounds that are discovered up to the time of release are typically included in a supplemental documentation file. This file is usually has a filename of "readme.txt" and is referred to as a readme file.

Most software users are aware of readme files. Many times, the user is prompted to open the readme file when the software product is installed. Other times, the readme file is simply stored with the installed program files. A readme file typically is comprised of a large number of small bits of information concerning different parts of the system. The ideal way to view a readme file is to focus on a particular portion when that portion is relevant, rather than reading the entire readme file as soon as the product is installed.

For other forms of documentation, such as help documentation, the user proactively looks for it because they want help. For a readme file, the user does not necessarily know about the anticipated need of the information; therefore, while the end user is expected to examine the readme file, most users simply overlook or deliberately ignore the readme file. Thus, an end user is likely to be unaware of broken functionality, last-minute features, or potential workarounds or troubleshooting tips. If something does not work as expected, a user may check only the printed documentation and, at best, treat the readme as a last resort.

SUMMARY OF THE INVENTION

The present invention recognizes the disadvantages of the prior art and provides a mechanism for incorporating additional last-minute documentation into an application. Upon initiation of the application, the application reads a documentation file having late-binding documentation content for the application. The documentation file includes at least one indicator that associates a portion of the documentation content with an application component of the application. The application identifies a given indicator within the at least one indicator that associates a given portion of the late-binding documentation content with a given application component. The application then modifies the given application component based on the given portion of the late-binding documentation content at runtime.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
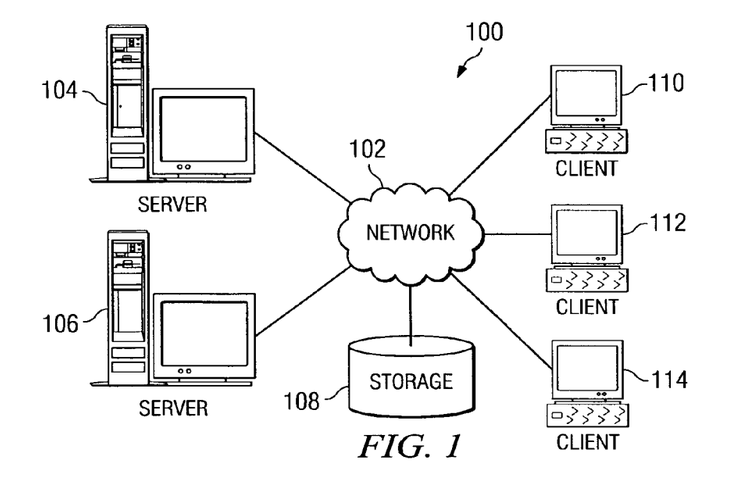
FIG. 1 depicts a pictorial representation of a network of data processing systems in which aspects of the present invention may be implemented.
Figure 2:
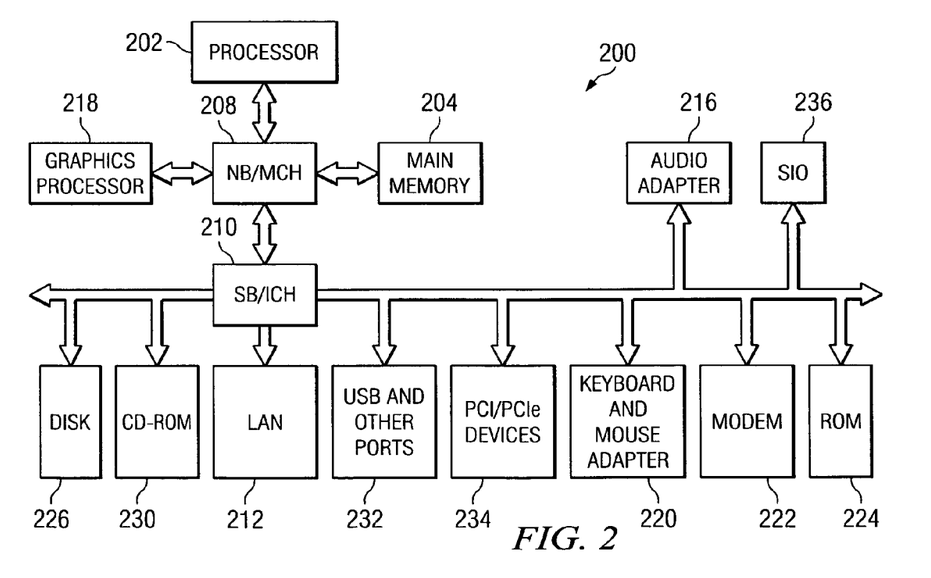
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

In accordance with exemplary aspects of the present invention, a readme file for a software application is tagged with a unique identifier that identifies a related application control or component. A readme file is a last-minute or late-binding documentation file that is created after the product is developed with its accompanying documentation. In other words, the readme file typically has late-binding information concerning aspects of the product that were observed too late to be included in the formal product documentation. The application reads in the readme file and finds all the identifications. At runtime, the application then changes the appearance or behavior of the controls or application components based on the information in the readme file.

The application may be installed on a client machine, such as one of clients 110, 112, 114 in FIG. 1, for example. The application may be installed from a removable storage medium, such as a compact disc, or may be downloaded from a server, such as one of servers 104, 106. Alternatively, the application may be installed on a server.

Figure 3A:
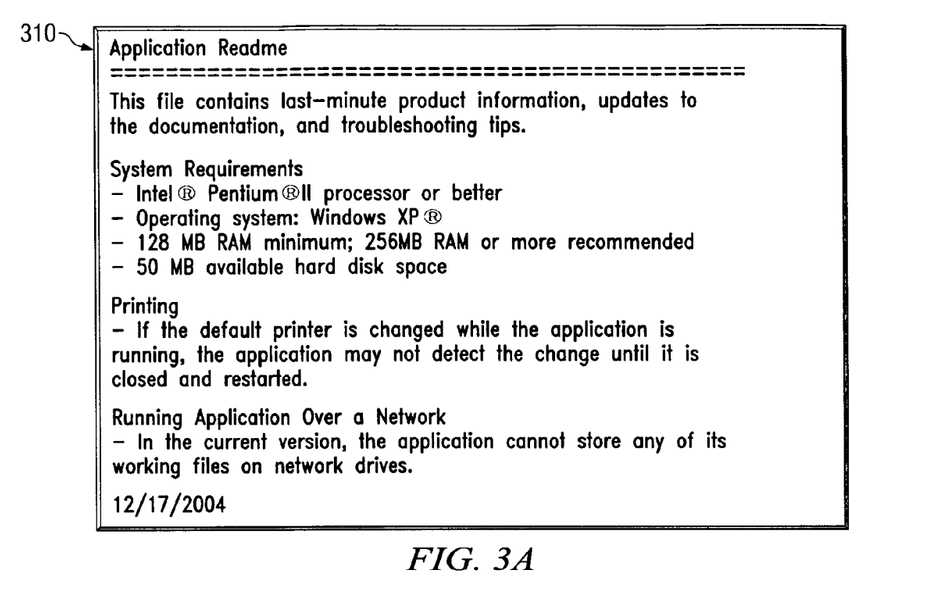
FIGS. 3A and 3B illustrate example documentation files in accordance with exemplary aspects of the present invention.
Figure 3B:
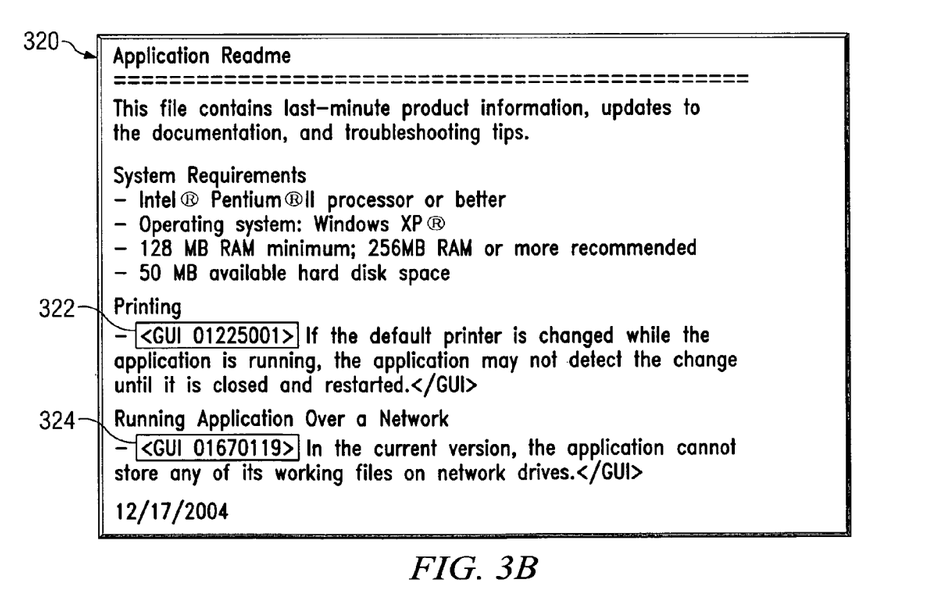

FIGS. 3A and 3B illustrate example documentation files in accordance with exemplary aspects of the present invention. More particularly, FIG. 3A illustrates a documentation file, such as a readme file. In the depicted example, documentation file 310 includes system requirements and known bugs and workarounds. Typically, a readme file will include much more information; however, documentation file 310 is simplified to illustrate the exemplary aspects of the present invention.

FIG. 3B illustrates a documentation file that is tagged with a unique identifier that identifies a related application control or component. For example, in documentation file 320, tag 322 identifies a graphical user interface (GUI) control using a unique identifier. In this example, the text marked by tag 322 concerns a known problem with print functionality. Therefore, the application may associate the tagged readme text with a print dialog, which is identified by the tag.

Similarly, tag 324 identifies a GUI control and the text marked by tag 324 concerns a known problem that occurs when attempting to store working files on a network drive.

Therefore, the application may associate the tagged readme text with a save dialog, which is identified by the tag.

The examples depicted in FIGS. 3A and 3B illustrate simple text files with specialized tags. Alternatively, a documentation file may be tagged with a markup language, such as hypertext markup language (HTML) or extensible markup language (XML). The documentation file may take other forms, such as a word processing document, a database, a table, or the like.

Figure 4:
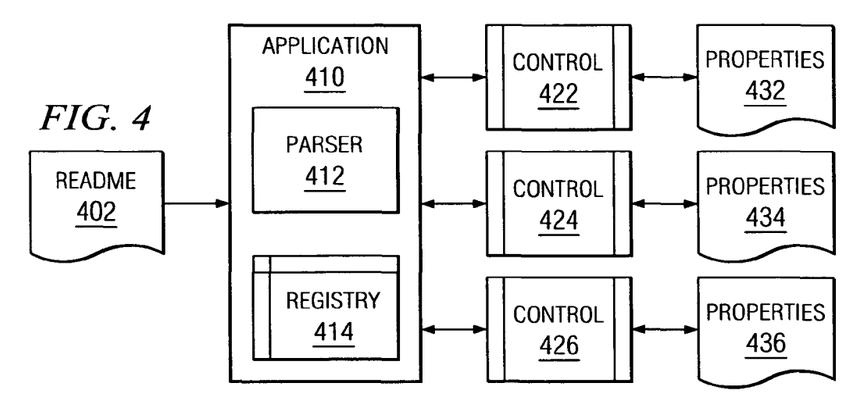
FIG. 4 is a block diagram illustrating functional components of a software application for displaying documentation information within the application in accordance with exemplary aspects of the present invention.

FIG. 4 is a block diagram illustrating functional components of a software application for displaying documentation information within the application in accordance with exemplary aspects of the present invention. While running, application 410 generates controls 422, 424, 426. Control 422 has associated properties 432, control 424 had associated properties 434, and control 426 has associated properties 436.

Many windowing systems are driven by event messages. These message based windowing systems do not make explicit function calls to obtain input. Instead, they wait for the system to pass input to them. The system passes all input for an application to the various windows in the application. The system calls a window control whenever it has input for the window. The window control processes the input and returns control to the system.

Whenever the user moves the mouse, clicks the mouse buttons, or types on the keyboard, the device driver for the mouse or keyboard converts the input into messages and places them in a message queue (not shown). Incoming messages include may include, for example, a "Create Button" message, a "Create Checkbox" message, a "Create Window" message, a "Create Menu" message, and so forth. Responsive to receiving create messages, the windowing system creates a corresponding system window control, such as a button, window, radio button, menu, to name some examples. The windowing system may include more or fewer controls depending upon the implementation. For example, a specialized computing device, such as an automated teller machine or television device, may include only a subset of the known window controls.

Code for these window controls serves as templates for creating control instances. In the depicted example, controls 422, 424, 426 may be templates for window controls that may be generated by application 410. The built-in system window controls are referred to herein as controls; however, the name for this code, as well as the specific implementation, may vary depending on the windowing system. These controls may also be referred to as software components or GUI components.

Application 410 reads in readme file 402. Application 410 may retrieve readme file 402 from a predetermined static location. Parser 412 parses readme file 402 for tags or other indicia that identify an application control. Also, parser 412 may identify a date stamp of readme file 402. Application 410 may check the date stamp to determine whether readme file 402 has changed since the last time the application was started. If readme file 402 has changed, application 410 may generate registry 414, which associates controls with readme content from readme file 402.

Application 410 may then modify properties for the identified application control. For example, if an entry in readme file 402 is associated with control 422, application 410 modifies properties 432. The application may modify properties to increase font size, alter or emphasize the typeface, change background color, or the like. The control would then appear different from other controls to indicate that the control has associated readme information. The user may then consult readme file 402 to obtain the relevant information.

Alternatively, application 410 may identify a portion of the readme information from readme file 402 associated with a control. Application 410 may then insert the identified portion into the properties file of the control. For example, if an entry in readme file 402 is associated with control 424, application 410 may insert the readme entry into properties 434 so that the readme text is presented to the user when an instance of control 424 is generated. In another exemplary embodiment, a link to readme file 402 or the relevant portion of readme file 402 may be inserted into the properties.

Furthermore, application 410 may generate a new control to present the relevant readme information from readme file 402. For example, application 426 may generate control 426 and properties 436 as a text box containing a portion of readme file 402. Control 422 or control 424 may then include the text box of control 426.

Still further, application 410 may modify a control so that the behavior of the control is altered. For instance, control 424 may be a save button and application 410 may modify control 424 and properties 434 so that selecting the button is disabled if readme file 402 indicates that the print function is not working. As another example, application 410 may modify control 424 and properties 434 so that performing a mouseover operation on the print button of control 424 causes a pop-up text box of control 426 to present the relevant readme information.

Readme file 402 may be a text file stored on disk 226 in FIG. 2, for example. Application 410, controls 422-426, and properties 432-436 may be software resident in main memory 204 and running on processor 202 in FIG. 2, for example.

FIGS. 5A-5E are example graphical user interfaces with incorporated readme information in accordance with exemplary aspects of the present invention. More particularly, with reference to FIG. 5A, an example application window 500 is illustrated. An application graphical user interface (GUI) is typically made up of multiple GUI controls, as described above. For example, window 500 is itself a control, which also comprises title bar control 502, menu bar control 504, button bar control 506, display area control 508, and status bar control 510. Each of these controls may also comprise other controls. For instance, button bar control 506 may further comprise a control for each button.

Figure 5A:
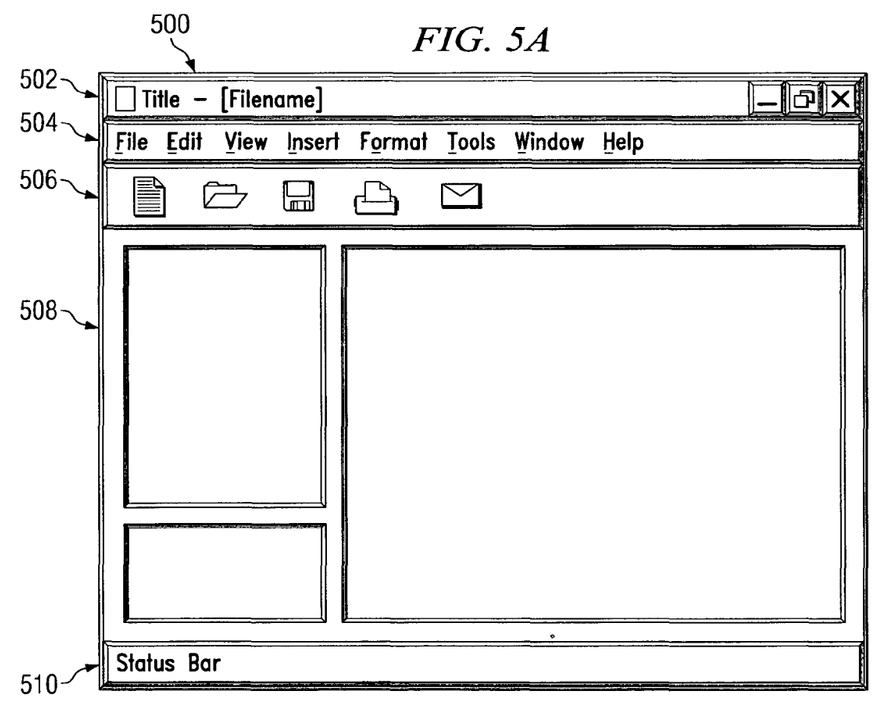
FIGS. 5A-5E are example graphical user interfaces with incorporated readme information in accordance with exemplary aspects of the present invention.

Each control has associated properties, which define, for example, the location of the control, the size of the control, typeface, font size, displayed text, and so forth. Controls may also have certain behaviors. For example, a button control may have particular behaviors, defined in the properties, on mouseover, mouse click, or right click.

Figure 5B:
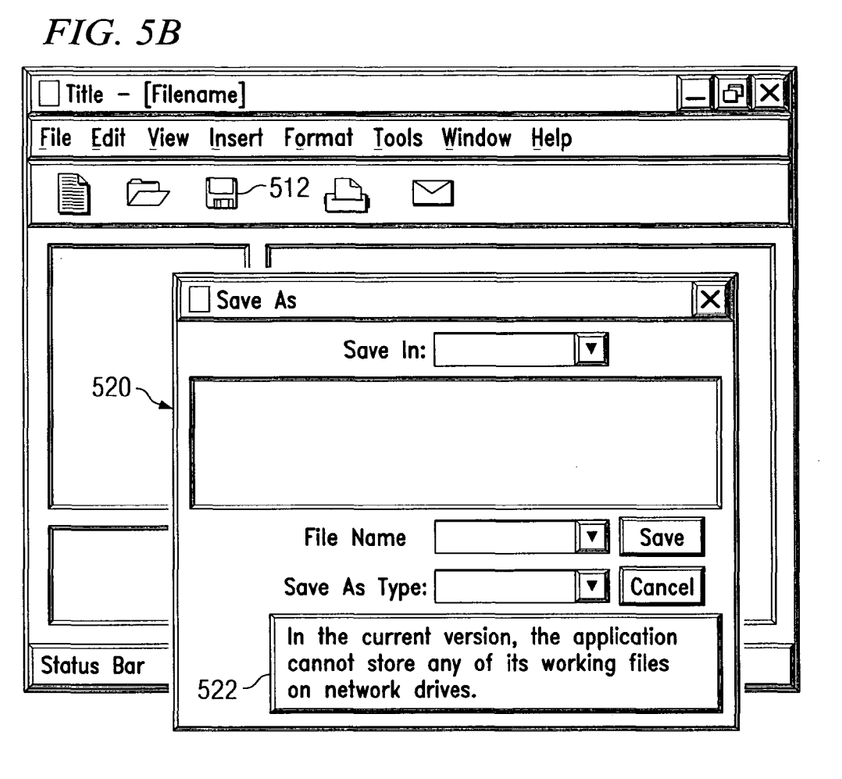

FIG. 5B illustrates an application graphical user interface with a save dialog. In this example, button toolbar 506 includes save button 512. When save button 512 is selected, "Save As" dialog 520 is generated. As previously stated, dialog 520 is itself a control, which comprises further controls, such as drop-down boxes, text fields, buttons, and the like.

In the depicted example, the application examines the readme file for the application and identifies a readme entry associated with the dialog graphical user interface control. The application then modifies the dialog control to include a text field control, which displays the readme text associated with the dialog control. Thus, the application generates an instance of dialog control 520 with text field control 522. Alternatively, the readme text may be inserted into the properties of an existing text field so that when an instance of the "Save As" dialog control is generated, the text appears with other text.

Figure 5C:
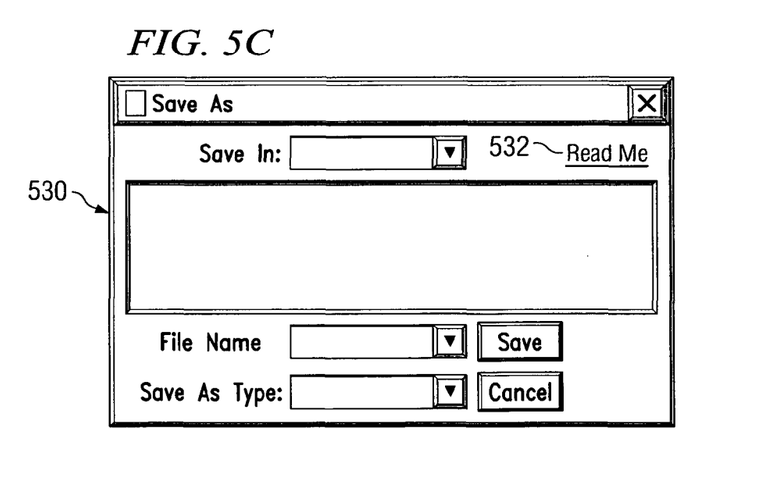

FIG. 5C illustrates an example of a save dialog with a readme indicator in accordance with exemplary aspects of the present invention. In this example, save dialog 530 is generated as an instance of a dialog control with readme indicator 532. In one exemplary embodiment, the application may modify the control to include a simple text field that alerts the user of readme content associated with dialog 530.

Figure 5D:
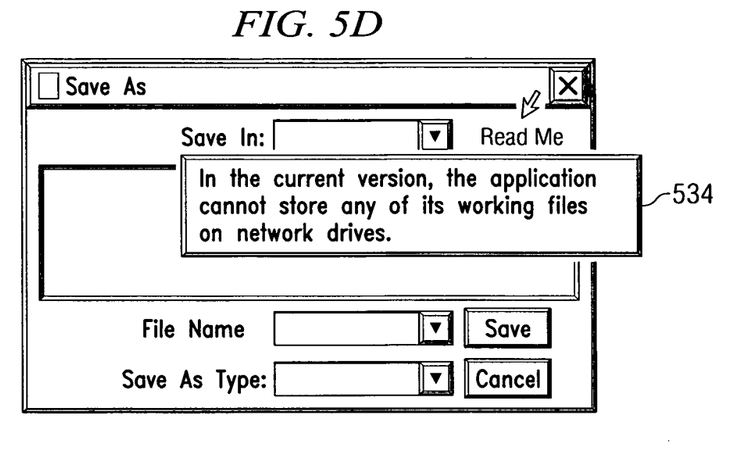

Alternatively, readme indicator 532 may be a text field with properties that give the text field certain behaviors. As illustrated in FIG. 5D, if the text field has a mouse click or mouseover behavior, an instance of a pop-up control 534 may be generated to present the readme content to the user. In yet another exemplary embodiment, readme indicator 532 may have a behavior upon mouse click of opening the readme file in a text editor (not shown) for presentation, for instance.

Figure 5E:
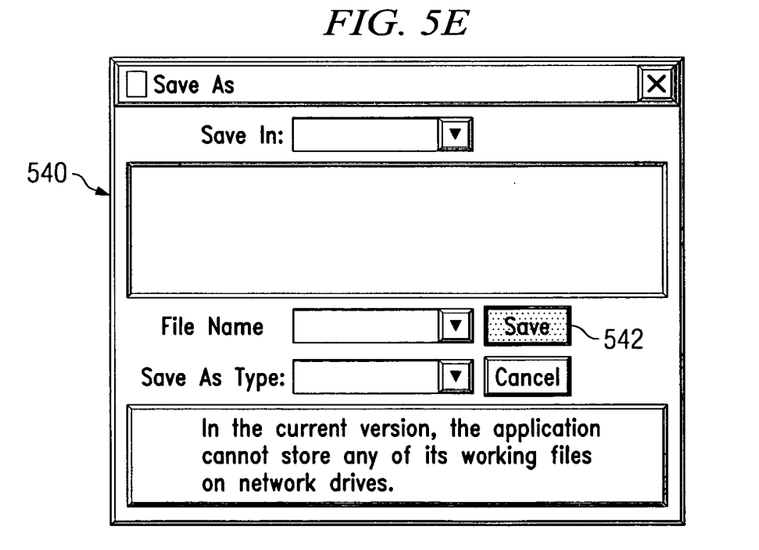

FIG. 5E illustrates an example of a save dialog with modified behavior in accordance with exemplary aspects of the present invention. In this example, a readme entry may be associated with save dialog 540 and/or "Save" button 542. In particular, the application may modify the properties of button control 542 to disable functionality. More specifically, the application may remove any mouse click behavior associated with button control 542 in the properties for the control.

The examples shown in FIG. 5A-5E are exemplary and are not intended to limit the invention. Other modifications to the presentation and behaviors of controls may be made, depending upon the implementation of the aspects of the present invention. For example, readme content may be converted to speech and presented audibly. As another example, window controls, or more particularly menu bar controls, may be modified to include a "Readme" menu. In another exemplary embodiment, the readme content, or a portion thereof, may be in another language different from the application language.

Figure 6:
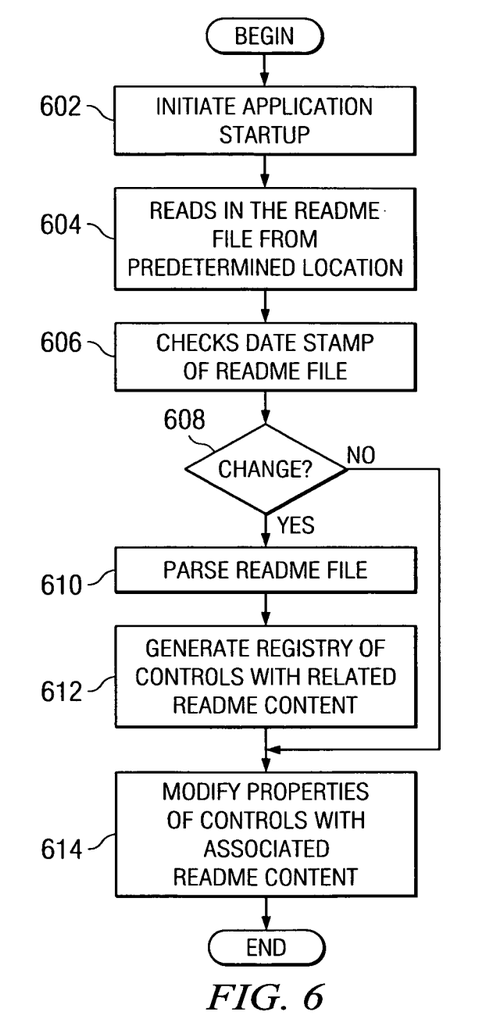
FIG. 6 is a flowchart illustrating operation of an application with readme content in accordance with exemplary aspects of the present invention.

FIG. 6 is a flowchart illustrating operation of an application with readme content in accordance with exemplary aspects of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks.

These computer program instructions may also be stored in a computer-readable memory, transmission medium, or storage medium that can direct a processor or other programmable data processing apparatus to function in a particular manner, such that the instructions stored in the computer-readable memory, transmission medium, or storage medium produce an article of manufacture including instruction means which implement the functions specified in the flowchart block or blocks.

Accordingly, blocks of the flowchart illustration support combinations of means for performing the specified functions, combinations of steps for performing the specified functions and computer usable program code for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With particular reference to FIG. 6, operation of an application is illustrated. Operation begins and a user initiates application startup (block 602). The application reads in the readme file from a predetermined location (block 604). Then, the application checks a date stamp of the readme file (block 606) and determines whether there are any changes to the readme file based on the date stamp (block 608).

If the readme file has changed since the last time the application was started, the application parses the readme file (610) and generates a registry of controls with related readme content (block 612). In an alternative embodiment, if the application is not able to persist the registry of controls associated with readme content, the application may perform blocks 610 and 612 every time the application is started, rather than checking the date stamp.

After generating the registry in block 612, the application modifies the properties of the controls with associated readme content (block 614) to incorporate the readme content or to modify behaviors of the controls based on the readme content. If the readme file has not changed since the last time the application was started in block 608, operation proceeds to block 614 to modify the properties of the controls with associated readme content. Thereafter, operation ends.

Once the properties of the controls are modified, whenever the application generates an instance of a control with associated readme content, the control will have the modified display or behavior. For example, if the properties of a control are modified to include a text field control with readme content, then an instance of the control will include the text field. If the properties of a control are modified to disable a mouse click behavior, then when the application creates an instance of the control, the control will have no mouse click behavior.

Thus, the exemplary aspects of the present invention solve the disadvantages of the prior art by providing application functionality for dynamically modifying controls based on readme content once application development is substantially complete. A developer marks up the readme file to include references to GUI controls. The application generates a registry that stores associations between the readme content and the affected controls. The application then modifies the properties of the affected controls at runtime to alter presentation or at least one behavior of the controls. When the application creates an instance of an affected control at runtime, the control includes the modified presentation or behavior.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for incorporating late-binding documentation into an application, the method comprising:
   initiating startup, by a processor, for an application;
   reading, by the processor, a documentation file having late-binding documentation content for the application, wherein the documentation file includes at least one indicator that associates a portion of the late-binding documentation content with an application component of the application, wherein the documentation file is a readme text file;
   identifying, by the processor, a first indicator within the at least one indicator, wherein the first indicator associates a given portion of the late-binding documentation content with a given application component, wherein the first indicator comprises a markup language tag identifying a graphical user interface control of the application using a unique identifier that identifies the application component;
   identifying, by the processor, a second indicator within the at least one indicator, wherein the second indicator associates a given portion of the late-binding documentation content with the given application component, wherein the second indicator comprises a markup language tag identifying that the application component has associated readme information within the readme text file; and
   modifying, by the processor, the given application component based on the given portion of the late-binding documentation content at runtime.

2. The method of claim 1, wherein modifying the given application component comprises:
   modifying, by the processor, properties of the given application component to insert the given portion of the late-binding documentation content.

3. The method of claim 1, wherein modifying the given application component comprises:
   modifying, by the processor, properties of the given application component to modify a behavior of the given application component.

4. The method of claim 1, wherein the given application component comprises a window control.

5. The method of claim 1, further comprising:
   checking, by the processor, a date stamp of the documentation file;
   determining, by the processor, whether the documentation file has changed based on the date stamp; and
   responsive to the documentation file being changed, populating, by the processor, a registry that associates each portion of the late-binding documentation content having an indicator with a corresponding application component of the application.

6. An apparatus for incorporating late-binding documentation into an application, the apparatus comprising:
   a memory having an application stored therein; and
   a processor, operatively coupled to the memory, wherein the processor is configured to initiate execution of the application and, under control of the application, perform the following:
      read a documentation file having late-binding documentation content for the application, wherein the documentation file includes at least one indicator that associates a portion of the late-binding documentation content with an application component of the application, wherein the documentation file is a readme text file;
      identify a first indicator within the at least one indicator, wherein the first indicator associates a given portion of the late-binding documentation content with a given application component, wherein the first indicator comprises a markup language tag identifying a graphical user interface control of the application using a unique identifier that identifies the application component;
      identify a second indicator within the at least one indicator, wherein the second indicator associates a given portion of the late-binding documentation content with the given application component, wherein the second indicator comprises a markup language tag identifying that the application component has associated readme information within the readme text file; and
      modify the given application component based on the given portion of the late-binding documentation content at runtime.

7. The apparatus of claim 6, wherein the processor, under control of the application, is configured to modify properties of the given application component to insert the given portion of the late-binding documentation content.

8. The apparatus of claim 6, wherein the processor, under control of the application, is configured to modify properties of the given application component to modify a behavior of the given application component.

9. The apparatus of claim 6, wherein the given application component comprises a window control.

10. The apparatus of claim 6, wherein the processor, under control of the application, is further configured to perform the following:
    check a date stamp of the documentation file;
    determine whether the documentation file has changed based on the date stamp; and
    responsive to the documentation file being changed, populate a registry that associates each portion of the late-binding documentation content having an indicator with a corresponding application component of the application.

11. A non-transitory computer readable medium having a computer program product encoded thereon, for incorporating late-binding documentation into an application, the computer program product comprising:

computer usable program code configured to initiate startup for an application;

computer usable program code configured to read a documentation file having late-binding documentation content for the application, wherein the documentation file includes at least one indicator that associates a portion of the late-binding documentation content with an application component of the application, wherein the documentation file is a readme text file;

computer usable program code configured to identify a first indicator within the at least one indicator, wherein the first indicator associates a given portion of the late-binding documentation content with a given application component, wherein the first indicator comprises a markup language tag identifying a graphical user interface control of the application using a unique identifier that identifies the application component;

computer usable program code configured to identify a second indicator within the at least one indicator, wherein the second indicator associates a given portion of the late-binding documentation content with the given application component, wherein the second indicator comprises a markup language tag identifying that the application component has associated readme information within the readme text file; and computer usable program code configured to modify the given application component based on the given portion of the late-binding documentation content at runtime.

12. The non-transitory computer readable medium of claim 11, wherein the indicator comprises a markup language tag.

13. The non-transitory computer readable medium of claim 11, wherein the computer usable program code configured to modify the given application component comprises:

computer usable program code configured to modify properties of the given application component to insert the given portion of the late-binding documentation content.

14. The non-transitory computer readable medium of claim 11, wherein the computer usable program code configured to modify the given application component comprises:

computer usable program code configured to modify properties of the given application component to modify a behavior of the given application component.

15. The non-transitory computer readable medium of claim 11, wherein the given application component comprises a window control.

16. The non-transitory computer readable medium of claim 11, further comprising:

computer usable program code configured to check a date stamp of the documentation file;

computer usable program code configured to determine whether the documentation file has changed based on the date stamp; and computer usable program code configured to populate a registry that associates each portion of the late-binding documentation content having an indicator with a corresponding application component of the application responsive to the documentation file being changed.

* * * * *